Dec. 18, 1951
D. A. ALBERT
2,579,287
FILM HOLDER
Filed Jan. 15, 1949
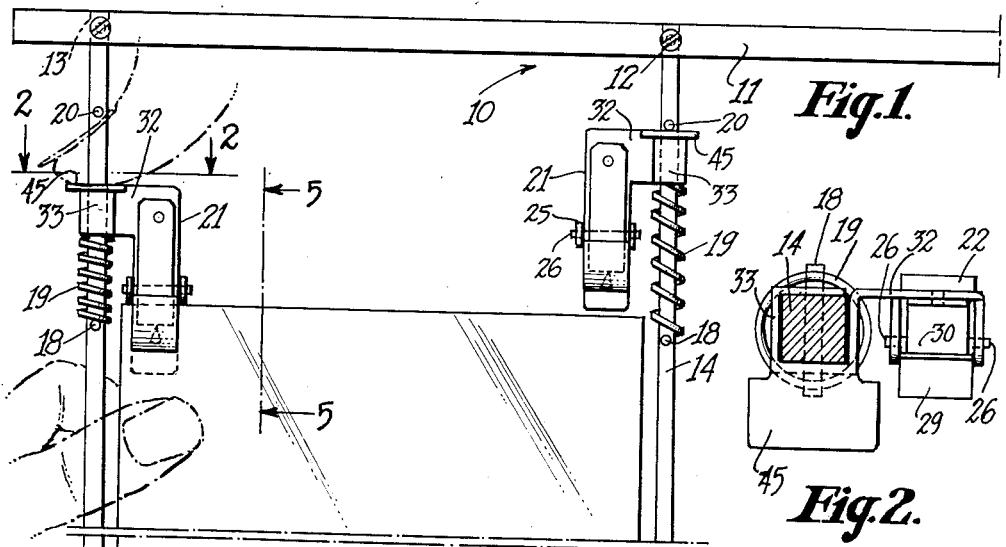
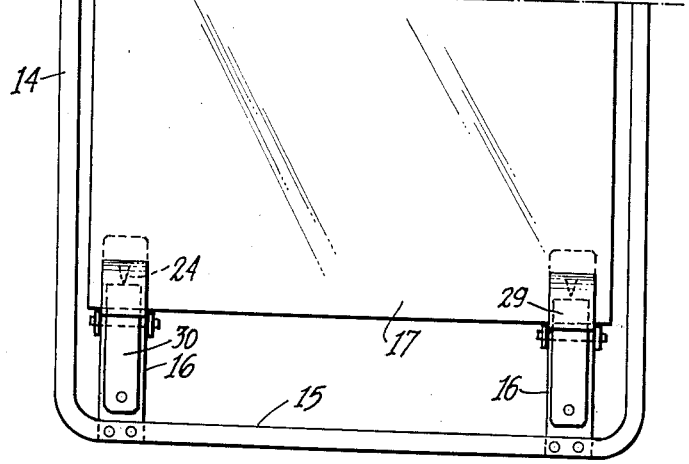
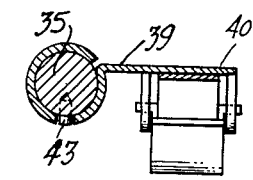
Fig. 4.
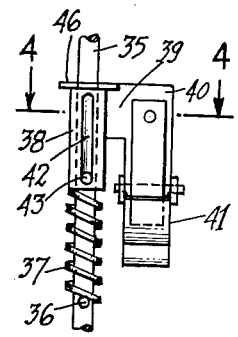
Fig. 3.
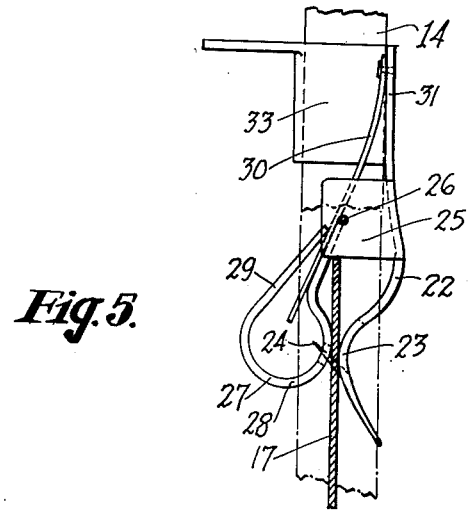
Fig. 5.
INVENTOR.
DANIEL A. ALBERT
BY
John J. Lynch
Atty.

Patented Dec. 18, 1951

2,579,287

UNITED STATES PATENT OFFICE 2,579,287

FILM HOLDER

Daniel A. Albert, Richmond Hill, N. Y.

Application January 15, 1949, Serial No. 71,155

3 Claims. (Cl. 95—100)

This invention relates to film holders and in particular to one in which film holding clips are mounted for touch manipulation.

In the handling of films in a dark room where they are developed, washed and inspected as well as dried, as in the case of X-ray films the operator must do practically all of the mounting of the films and removing them with respect to a holder frame by the sense of touch and in order to provide a holder of the character that will be found most useful, it is necessary to coordinate the action of the clips with a tensioning means on the frame of the holder so that the films may be quickly mounted and held taut in the frame and to provide a holder in which films of varying size may be accommodated without adjustment of any of the parts of the holder.

Further objects of the invention are to provide clips structures that lend themselves to mounting of the films therein in such a manner that they can be quickly and easily detached from the holder by a tugging operation without in any way damaging the film; to provide clip structures that guide the film edges into place and limit the movement thereof with respect to the frame and to provide a holder and clip structure that is simple to make, is easy to operate by touch or feel and one which lends itself to an easy and rapid manipulation in the processing of the large quantities of films that are processed in a busy laboratory.

Other objects of the invention are to provide a holder in which the film will be automatically squared and tensioned across diagonally opposite corners thereof to prevent wrinkling in the drying operation; to provide a mounting for the clips so that they can be manipulated with the hand that holds the frame and with a minimum amount of thumb pressure that can be gradually relieved to place tension on the film at the corners thereof, and to carry out the objects set forth in my pending application Serial No. 770,204, filed August 23, 1947, now abandoned, for Film Holder, and of which this application is a continuation-in-part.

With these and other objects in view, the invention comprises certain constructions hereinafter described and then particularly pointed out in the claims and a preferred embodiment of my invention is illustrated in the accompanying drawings, in which:

Figure 1 is a side view of a film holding frame showing a film mounted therein for processing, one of the upper clips being shown in engagement with the film, Figure 2 is a greatly enlarged section taken on the line 2—2 of Figure 1 showing the mounting of the clip, Figure 2 is a side view of a modified form of clip mounting, Figure 4 is a greatly enlarged section taken on the line 4—4 of Figure 3 showing the mounting of the clip, and Figure 5 is an enlarged section on the line 5—5 of Figure 1.

Referring to the drawings in detail, 10 indicates a frame or holder which consists of a top or support bar 11, into suitable openings in which are secured as by screws or rivets 12, the ends 13 of the legs 14 of a U-shaped carrier frame 15. The latter, along its bottom edge has secured thereto, in any suitable manner spaced clips 16 located adjacent the corners of the carrier frame in position to grip the lower edge of a film 17 so that the latter is held in coplanar relation with the frame and is thereby protected along its vertical edges when the holder is placed in a developing tank.

Each of the legs 14 of the holder, which in this instance is made from metal stock that is square in cross sectional shape, is provided near the upper end thereof with spaced stop pins. A lower stop pin 18 supports a coiled spring 19 and the upper stop pin 20 limits the upward movement of a clip 21 under influence of the spring 19, the spring and the clip being mounted on the leg.

The clips 16 and 21 are substantially similar in structure except that the clips 21 are formed to provide means for mounting the same on the legs of the holder. Each of the clips (Figure 5) consists of a lower jaw portion 22 shaped to provide an arcuate section 23 out of which is punched a piercing prong 24 which is positioned at such an oblique angle with respect to a film to be held, that the edge of the film will slide over the tip of the prong to limit against the edges of ears 25 formed integrally with said jaw portion 22, and at opposite sides thereof. The ears serve as a trunnion for the projected stud ends 26 of the outer or upper jaw portion 27 which is shaped to provide a bulging or cylindrical section which coacts with the arcuate section 23 of the lower jaw to guide the edge of the film into place in the clip without assistance on the part of the operator. The cylindrical section 28 is provided with a suitable opening for receiving the end of the prong 24 and the section 28 provides a finger pressure member that prevents the prong from piercing the finger and at the same time serves to quickly and easily force the film over the end of the prong to be impaled thereon.

The material of the upper jaw 27 is extended as at 29 and is spaced from the pivoted part of the jaw to allow passage of the free end of a thin leaf spring 30 that is riveted or otherwise secured to the extended portion or base 31 of the jaw portion 22. This extension 31 in the case of the lower clips is directly soldered, riveted, screwed or otherwise secured to the bottom run of the frame 15, while in the case of the upper clips is formed to provide a laterally extending arm 32 terminating in a sleeve 33 that conforms in cross sectional shape to the like shape of the leg of the frame 15. In Figure 1, the view is considered as looking at what might be the front of the frame for example, and as seen in Figure 2, the arm 32 is aligned with the back edge or surface of the leg 14 so that the opening in the clip that receives the edge of the film is always maintained substantially midway in the depth of the frame. Thus the film is held inside the frame and protected.

In Figures 3 and 4, the clip is shown as being mounted on a holder frame, on a leg 35 thereof that is round in cross section. A pin 36 holds one end of a spring 37 which presses against the lower end of a cylindrical sleeve 38 formed integrally with the extension 39 projecting laterally from the end 40 of a clip 41. The latter is made otherwise in accordance with the structure of the clips 16 and 21 as explained. The sleeve 38 is slotted as at 42 to receive a pin 43 which is secured in the leg 35 and limits the endwise movement of the clip as well as preventing turning movement of the clip about the leg. Thus the film receiving opening between the clip jaws is always held in coplanar relation to the legs of the frame and the film likewise mounted to protect the same.

In a number of frames in present use, the clips are mounted on spring arms which tension the film, but in the use of these in darkness the hands, and sleeves of the operator's clothing, strikes these arms and distorts them and the clips are not only hard to find, but do not support the film in coplanar relation to the frame for protection. My mounting of the clips on the side legs of the holder provides for the location of a thumb blade which makes it possible for the operator to grip the bar 11 with the hand and at the same time use the thumb of the same hand to adjust the clips. Each of the upper movable clips is shaped to provide, in the sleeve 33 thereof, an outwardly extending tab adjacent the upper end of the sleeve as at 45 so that pressure of the thumb is substantially aligned with the resistance offered by the spring and the clip can be pushed down without causing the sleeve to have frictional gripping effect on the leg as would be the case if the inner edge of the clip was pushed down. The clips 41 in the sleeved portions 38 thereof are also provided with the tabs 46 serving the same purpose.

With the mounting of the upper clips on the legs, they may be manipulated individually and by the springs associated therewith are individually adjustable under spring pressure to tension the film at each of the upper corners thereof just enough to tauten the film and constantly hold it smooth under pressure so that it can dry flat and unwrinkled. When the film is dry it is removed by pulling the ends outwardly and because the clip prongs are disposed at the angle described, the hinged upper or outer jaws of the clips in yielding, allow the film to leave the clips without damage and with a minimum of effort on the part of the operator.

My invention is not to be restricted to the precise details of construction shown since various changes and modifications may be made therein without departing from the scope of the invention or sacrificing the advantages to be derived from its use.

What I claim is:

1. In a film holder including a support bar and a substantially U-shaped frame suspended therefrom, a pair of fixed clips at the lower end of the frame for engagement with the lower end of a film, a pair of movable clips adjacent the upper end of the frame for engaging the upper end of the film, sleeve means extending from said upper clips and embracing the vertical legs of said frame for mounting the movable clips for sliding movement parallel to and along the legs of the frame, spring means for urging the movable clips individually in a direction away from the fixed clips to hold a film therebetween under tension, means for preventing rotation of the movable clips with respect to the legs, a tab on each sleeve engageable by the thumb of a hand gripping the support bar whereby each clip may be separately forced into engagement with the upper edge of the film, each clip being shaped to provide upper and lower closed jaws having contacting relatively yieldable arcuate portions constituting a guide for the edge of a film forced therebetween, one of the arcuate portions being punched to provide a prong extending obliquely into an opening in the other contacting arcuate portion and upon which prong the film is impaled and from which it can be pulled by a tug on the film, and spring means for keeping the jaws closed.

2. A holder as set forth in claim 1, including ears on one of the jaws, means for pivoting the other jaw between said ears, an extension on the eared jaw for connecting the clip to said sleeve means and the ears of said jaw constituting stops for limiting the movement of the edge of the film into said clips and over said prongs.

3. In a film holder including a support bar and a frame suspended therefrom presenting parallel vertical legs and a horizontal bottom portion, clips shaped to provide upper and lower closed jaws having contacting relatively yieldable arcuate portions constituting a guide for the edge of a film forced therebetween, one of the arcuate portions being punched to provide a prong extending obliquely into an opening in the other contacting arcuate portion and upon which prong the film is impaled and from which it can be pulled by a tug on the film, spring means for keeping the jaws yieldably closed, upper and lower pairs of clips mounted in the frame parallel to said legs and with the entrance ends of the jaws of the respective pairs in opposing relation, sleeves on the upper pair of clips for slidable engagement with said legs, springs for urging the sleeves along said legs to tension a film held in said upper and lower pairs of clips, and a blade on each sleeve for manual operation in advancing the associated clip in a direction parallel to the leg on which it is mounted and into contact with the upper edge of a film in the frame.

DANIEL A. ALBERT.

REFERENCES CITED

The following references are of record in the file of this patent:

UNITED STATES PATENTS

| Number | Name | Date |
| --- | --- | --- |
| 1,666,895 | Gollomb | Apr. 24, 1928 |
| 1,854,931 | Gollomb | Apr. 19, 1932 |
| 2,180,010 | Martin | Nov. 14, 1939 |
| 2,299,779 | Wolf | Oct. 27, 1942 |